US010226898B2

(12) United States Patent
Shik Kwak

(10) Patent No.: US 10,226,898 B2
(45) Date of Patent: Mar. 12, 2019

(54) METHOD FOR CONNECTING PLASTIC PIPES AND STRUCTURE FOR CONNECTING THE SAME

(71) Applicant: Georg Fischer Piping Systems Ltd., Schaffhausen (CH)

(72) Inventor: You Shik Kwak, Busan (KR)

(73) Assignee: Georg Fischer Piping Systems Ltd., Schaffhausen (CH)

( * ) Notice: Subject to any disclaimer, the term of this patent is extended or adjusted under 35 U.S.C. 154(b) by 274 days.

(21) Appl. No.: 15/034,576

(22) PCT Filed: Nov. 4, 2014

(86) PCT No.: PCT/EP2014/073619
§ 371 (c)(1),
(2) Date: May 5, 2016

(87) PCT Pub. No.: WO2015/067573
PCT Pub. Date: May 14, 2015

(65) Prior Publication Data
US 2016/0279861 A1     Sep. 29, 2016

(30) Foreign Application Priority Data

Nov. 8, 2013   (KR) .................. 10-2013-0135154

(51) Int. Cl.
*B29C 65/34*      (2006.01)
*B29C 65/00*      (2006.01)
(Continued)

(52) U.S. Cl.
CPC ...... *B29C 65/3488* (2013.01); *B29C 65/3444* (2013.01); *B29C 66/112* (2013.01);
(Continued)

(58) Field of Classification Search
CPC ............ B29C 65/3488; B29C 65/3444; B29C 66/112; B29C 66/131; B29C 66/52241
See application file for complete search history.

(56) References Cited

U.S. PATENT DOCUMENTS

| 3,907,625 A | 9/1975 | Vogelsanger |
| 5,286,952 A * | 2/1994 | McMills ............... B29C 61/006 |
| | | 156/105 |
| 2007/0210576 A1* | 9/2007 | Shook .................... F16L 41/04 |
| | | 285/197 |

FOREIGN PATENT DOCUMENTS

| EP | 0430761 A2 | 6/1991 |
| KR | 1020020012809 A | 2/2002 |

(Continued)

OTHER PUBLICATIONS

International Search Report and Written Opinion of the International Searching Authority for PCT/EP2014/073619, dated Jan. 23, 2015; ISA/EP.

*Primary Examiner* — Daniel McNally
(74) *Attorney, Agent, or Firm* — Harness, Dickey & Pierce, P.L.C.

(57) ABSTRACT

Disclosed herein is a method for connecting first (110) and second (120) plastic pipes. The method includes: placing an end of the second plastic pipe (120) on a target portion of the first plastic pipe (110) that is intended to form a connection hole (111), the end of the second plastic pipe (120) being provided with an arch-shaped heating element (130) made of conductive plastic material, electric connection terminals (140) disposed in the heating element (130) on opposite sides of the target portion, and a cover (121) covering at least an outer surface of the arch-shaped heating element (130); supplying power to the electric connection terminals (140) to heat the arch-shaped heating element (130) so that the second plastic pipe (120) is fused to the first plastic pipe
(Continued)

(110); and forming the connection hole (111) in the cover (121), the arch-shaped heating element (130) and the side surface of the first plastic pipe (110), so that the first plastic pipe (110) and the second plastic pipe (120) communicate with each other.

3 Claims, 8 Drawing Sheets

(51) Int. Cl.
  *F16L 47/03* (2006.01)
  *F16L 47/30* (2006.01)
  *B29K 23/00* (2006.01)
  *B29L 23/00* (2006.01)

(52) U.S. Cl.
  CPC ...... *B29C 66/131* (2013.01); *B29C 66/52241* (2013.01); *F16L 47/03* (2013.01); *F16L 47/30* (2013.01); *B29C 65/3468* (2013.01); *B29C 66/5224* (2013.01); *B29C 66/71* (2013.01); *B29C 2793/009* (2013.01); *B29K 2023/06* (2013.01); *B29K 2023/12* (2013.01); *B29L 2023/22* (2013.01)

(56) References Cited

FOREIGN PATENT DOCUMENTS

| KR | 1020040069622 A | 8/2004 |
|---|---|---|
| KR | 1020040096757 A | 11/2004 |
| KR | 1020050003231 A | 1/2005 |
| WO | WO-2007091799 A1 | 8/2007 |

\* cited by examiner

METHOD FOR CONNECTING PLASTIC PIPES AND STRUCTURE FOR CONNECTING THE SAME

BACKGROUND OF THE INVENTION

1. Field of the Invention

The present invention relates to a method and structure for connecting two plastic pipes to each other in a T-shaped form through electric fusion.

2. Description of the Related Art

Electric fusion is generally used to connect pipes to each other, and connection of pipes will be described below centered on such electric fusion.

In bonding of pipes made of polyethylene, polypropylene or the like to be used for gas pipes, tap water pipes and other purposes, heat fusion methods have been mainly used to provide a completely hermetic seal.

Conventional heat fusion methods are classified into a butt fusion method, a heat fusion socket method, an electro-fusion socket method, an electric fusion method, and so on.

Butt fusion is also referred to as butt fusion welding, in which ends of pipes are butted and fused to each other without use of a separate socket. In detail, butt fusion is conducted according to the following steps of: fixing the pipes in hydraulic or pneumatic clamps in such a way that the ends of the pipes to be fusion-bonded face each other; smoothing the ends of the pipes to be fusion-bonded; placing a heating plate between the ends of the pipes; tightly pressing the ends of the pipes onto the heating plate using hydraulic or pneumatic pressure; heating the heating plate to an appropriate melting point (e.g., about 210° C. for polyethylene) to fuse the ends of the pipes; rapidly removing the heating plate from the pipes; tightly pressing the fused ends of the pipes onto each other; and cooling the pipes while maintaining them in the above state for a predetermined time until the fused ends of the pipes are solidified, thus completing bonding of the pipes.

The above-mentioned method bonds the pipes by melting pipe materials and does not require use of a separate socket. However, this method requires a heat welding machine which is heavy to carry to a working site and has a complex structure.

Another method uses a typical connection socket, in which the inner circumferential surface of the socket and the outer circumferential surfaces of pipes are melted at the same time and then bonded together. That is, the outer circumferential surfaces of the pipes and the inner circumferential surface of the socket are heated at the same time so that the target surfaces are fused simultaneously, and after they are heated sufficiently, the inner circumferential surface of the socket is rapidly fitted over the outer circumferential surfaces of the pipes. Thereafter, the coupled pipe structure is cooled for a predetermined time.

Hereinafter, the electro-fusion socket method will be explained. This process uses a socket which has therein a heating element such as a heating coil. The socket is injection-molded with the heating element integrally disposed therein. For example, a copper wire, a copper alloy wire, a nichrome wire, etc. which have an appropriate degree of electrical resistance is used as the heating coil. Such an electro-fusion socket integrally provided with an electric resistance wire is manufactured by winding an electric resistance wire coated with thermoplastic resin in a coil form, connecting electric terminals to ends of the wire, disposing the wire in a mold, and molding resin. After the socket manufactured in this way is fitted over pipes to be fused, electric current is applied to the socket for a predetermined time by a simple power supply. Then, the outer circumferential surfaces of the pipes and the inner circumferential surface of the socket are fused at the same time and bonded together.

Such an electro-fusion socket method is also referred to as electric fusion or electro-fusion.

Electric fusion has been generally used for seamed pipes.

At present, electro-fusion seamed pipes are preferred by users because of facilitation of work, and various heating elements for the electro-fusion connector pipes are being developed.

In addition to the foregoing techniques, incorporated hereby by reference in their entirety into this specification, electro-fusion techniques were also proposed in Korean Patent Laid-open Publication No. 10-2002-0012809, entitled "ELECTRONIC FUSION SHEET OF THERMOPLASTIC (E.G., POLYETHYLENE OR POLYPROPYLENE) PIPES USING PRINTED (COATED) HEATING CIRCUIT," Korean Patent Laid-open Publication No. 10-2004-069622, entitled "HEAT GENERATING BUSHING FOR FUSION OF PLASTIC PIPES," Korean Patent Laid-open Publication No. 10-2004-0096757, entitled "FUSION STRUCTURE FOR PLASTIC PIPES," Korean Patent Laid-open Publication No. 10-2005-0003231, entitled "FUSION STRUCTURE FOR PLASTIC PIPES USING FUSION RING" and so on.

Meanwhile, another conventional technique was proposed in PCT International Application No. PCT/KR2007/000540, entitled "ELECTRIC FUSION PIPING MATERIAL WITH SCREW PRESSING DEVICE", which was filed by the applicant of the present invention. This conventional technique provides an electric fusion piping device which includes a pipe joint made of plastics to be connected with a plastic pipe. The pipe joint has a thread formed on an inner circumferential surface thereof for threaded coupling. An annular heating element is provided in an inner circumferential surface of the pipe joint for electric fusion. The electric fusion piping device further includes a pressing member. The pressing member includes a threaded portion which engages with the thread of the pipe joint, and a pressing portion which moves forward in response to rotation of the threaded portion to press the annular heating element. Particularly, in this technique, conductive plastic is used as the material of the annular heating element.

Such processes of connecting plastic pipes are mainly conducted in such a way that linear pipes are arranged in a line and then connected to each other.

Meanwhile, a plastic pipe may be connected at an end thereof to another plastic pipe that has been installed, after a connection hole is formed the existing plastic pipe. In other words, a plastic pipe may be required to be connected to the existing plastic pipe in a branch form on a construction site.

In this case, typically, butt fusion method or heat fusion socket method is mainly used.

PRIOR ART DOCUMENT

Patent Document

PCT/KR2007/000540 "ELECTRIC FUSION PIPING MATERIAL MATERIALS WITH SCREW PRESSING DEVICE"

Korean Patent Laid-open Publication No. 10-2002-0012809 "ELECTRONIC FUSION SHEET OF THERMO- PLASTIC (E.G., POLYETHYLENE OR POLYPROPYL-ENE) PIPES USING PRINTED (COATED) HEATING CIRCUIT"

Korean Patent Laid-open Publication No. 10-2004-069622 "HEAT GENERATING BUSHING FOR FUSION OF PLASTIC PIPES"

Korean Patent Laid-open Publication No. 10-2004-0096757 "FUSION STRUCTURE FOR PLASTIC PIPES"

Korean Patent Laid-open Publication No. 10-2005-0003231 "FUSION STRUCTURE FOR PLASTIC PIPES USING FUSION RING"

SUMMARY OF THE INVENTION

Accordingly, the present invention has been made keeping in mind the above problems occurring in the prior art, and an object of the present invention is to provide a method and structure for connecting two plastic pipes to each other in a T-shaped form through electric fusion and, particularly, a method and structure for connecting a plastic pipe, in a branch shape, to another plastic pipe that has been already installed.

In order to accomplish the above object, in an aspect, the present invention provides a method for connecting first and second plastic pipes to each other in such a way that an end of the second plastic pipe is connected to a side surface of the first plastic pipe to communicate the first plastic pipe with the second plastic pipe, the method including: placing the end of the second plastic pipe on a portion of an outer surface of the first plastic pipe, the portion being intended to form a connection hole therein, the end of the second plastic pipe being provided with: an arch-shaped heating element made of conductive plastic material that generates heat using electricity applied thereto, the arch-shaped heating element having an arch cross-sectional shape to cover the connection hole; a pair of electric connection terminals disposed parallel to each other in the arch-shaped heating element on opposite sides of the portion intended to form the connection hole therein; and a cover covering at least an outer surface of the arch-shaped heating element; supplying power to the electric connection terminals to heat the arch-shaped heating element so that the second plastic pipe is fused to the first plastic pipe; and forming the connection hole in the cover, the arch-shaped heating element and the side surface of the first plastic pipe after supplying the power is conducted, so that the first plastic pipe and the second plastic pipe communicate with each other through the connection hole.

The electric connection terminals may be in line contact with the arch-shaped heating element, and shortest distances between the electric connection terminals at all points of any one of the electric connection terminals may be equal to each other.

In another aspect, the present invention provides a structure for connecting first and second plastic pipes to each other in such a way that an end of the second plastic pipe is fused to a side surface of the first plastic pipe to communicate the first plastic pipe with the second plastic pipe through a connection hole, the structure including: an arch-shaped heating element made of conductive plastic material that generates heat using electricity applied thereto, the arch-shaped heating element closing the end of the second plastic pipe and having an arch cross-sectional shape to cover the side surface of the first plastic pipe; a pair of electric connection terminals disposed parallel to each other in the arch-shaped heating element on opposite sides of a portion intended to form the connection hole therein; and the second plastic pipe provided on the end thereof with a cover covering at least an outer surface of the arch-shaped heating element.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
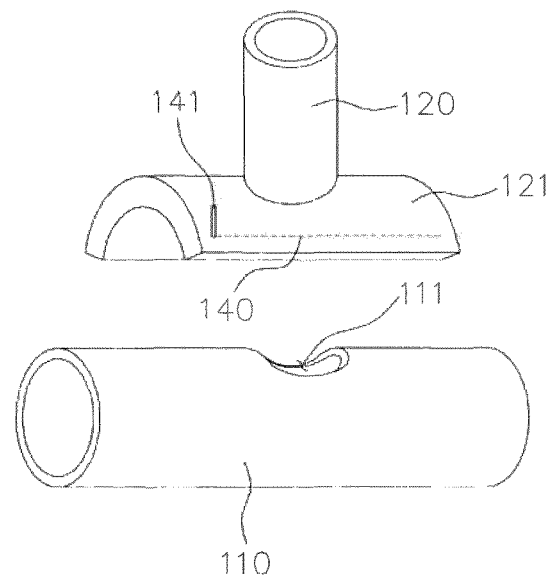
FIG. 1 is a perspective view showing a first plastic pipe that is just before being placed on a second plastic pipe according to a comparative example of the present invention.

Hereinafter, a preferred embodiment of the present invention will be described in detail with reference to the attached drawings, such that those skilled in the art can easily implement the present invention. The present invention is realized in various manners and is not limited to the following embodiment. Furthermore, in the drawings, portions which are not related to the present invention should be omitted to explain the present invention more clearly. Reference should be made to the drawings, in which similar reference numerals are used throughout the different drawings to designate similar components.

In the specification, when the explanatory phrase "a part includes a component" is used, this means that the part may further include other components rather than excluding the components unless special explanation is given.

A comparative example introduced by the inventor of the present invention will be explained, and problems thereof will be described.

Figure 2:
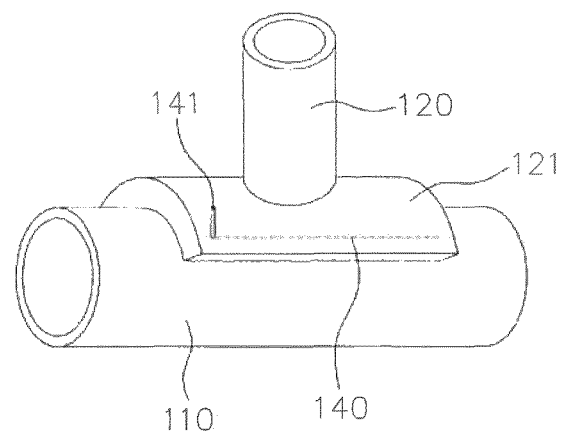
FIG. 2 is a perspective view showing the first plastic pipe placed on the second plastic pipe of FIG. 1.
Figure 3:
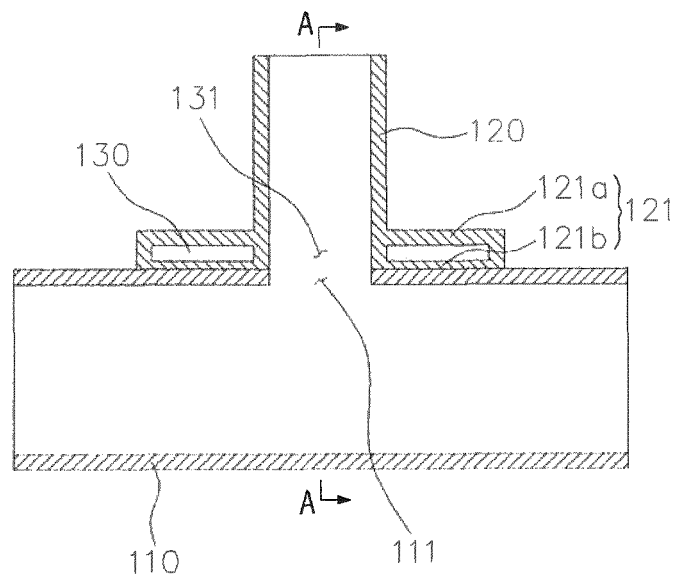
FIG. 3 is a longitudinal sectional view of FIG. 2.
Figure 4:
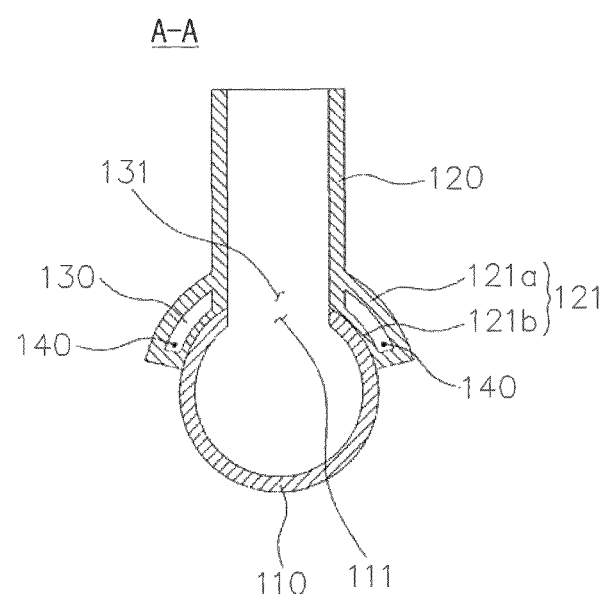
FIG. 4 is a sectional view taken along line A-A of FIG. 3.
Figure 5:
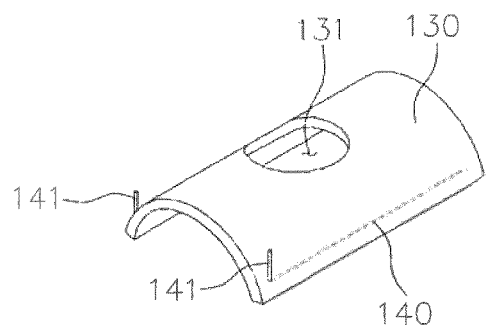
FIG. 5 is a perspective view of an arch-shaped heating element used in the comparative example of the present invention.
Figure 6:
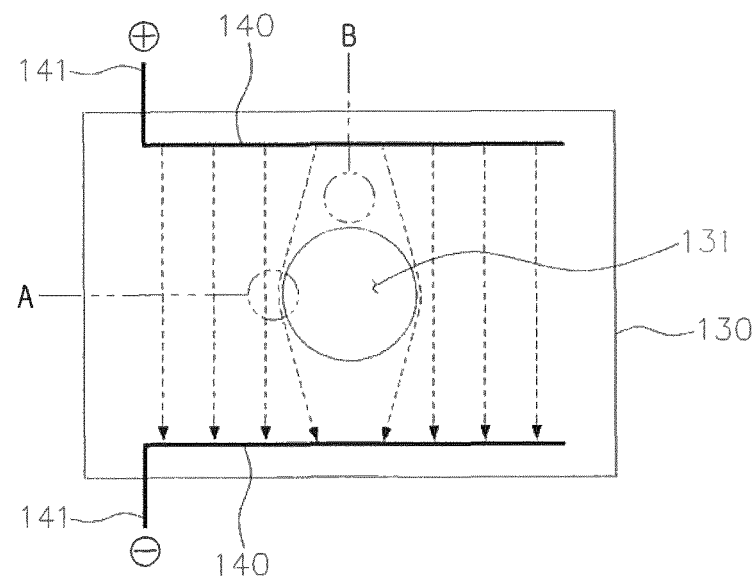
FIG. 6 is a conceptual view showing conditions in which power is applied to the arch-shaped heating element of FIG. 5.

FIG. 1 is a perspective view showing a first plastic pipe that is just before being placed on a second plastic pipe according to a comparative example of the present invention;

FIG. 2 is a perspective view showing the first plastic pipe placed on the second plastic pipe of FIG. 1. FIG. 3 is a longitudinal sectional view of FIG. 2. FIG. 4 is a sectional view taken along line A-A of FIG. 3. FIG. 5 is a perspective view of an arch-shaped heating element used in the comparative example of the present invention. FIG. 6 is a conceptual view showing conditions in which power is applied to the arch-shaped heating element of FIG. 5.

The first plastic pipe 110 has a tubular shape and is open on opposite ends thereof. A connection hole 111 is formed in a medial portion of the first plastic pipe 110. Of course, another plastic pipe, a seamed pipe or other kind of piping substance can be connected to each end of the first plastic pipe 110. The first plastic pipe 110 is in a state of being already installed on a site. The second plastic pipe 120 is to be connected to the first plastic pipe 110.

The connection hole 111 is used to communicate the first plastic pipe 110 with the second plastic pipe 120.

A separate structure for connection to another plastic pipe may be provided on each of opposite ends of the first plastic pipe 110, but this is irrelevant to the core of the present invention, so further explanation thereof will be omitted.

The second plastic pipe 120 is connected to the first plastic pipe 110.

The second plastic pipe 120 also has a tubular structure which is open on opposite ends thereof.

A first end of the opposite ends of the second plastic pipe 120 is placed on the first plastic pipe 110 such that the second plastic pipe 120 communicates with the connection hole 111 of the first plastic pipe 110.

Although the second plastic pipe 120 is illustrated as having a typical pipe shape, it may have a seamed pipe shape.

To achieve the above-mentioned placement of the second plastic pipe 120, as shown in this comparative example, the second plastic pipe 120 may be oriented perpendicular to the first plastic pipe 110. Alternatively, the second plastic pipe 120 may be inclined to the first plastic pipe 110.

Meanwhile, a cover 121 is provided on the first end of the second plastic pipe 120. The cover 121 has a shape corresponding to the outer circumferential surface of the first plastic pipe 110. The cover 121 is placed on the first plastic pipe 110 in such a way that the cover 121 partially covers the outer circumferential surface of the first plastic pipe 110.

Furthermore, the cover 121 has a shape in which it radially extends from the first open end of the second plastic pipe 120.

To correspond to the shape of the outer circumferential surface of the first plastic pipe 110, as shown in FIG. 4, the cross-section of the cover 121 must have an arch shape because the first plastic pipe 110 is cylindrical.

Of course, the central portion of the cover 121 is open.

An arch-shaped heating element 130 is provided in the cover 121 of the second plastic pipe 120.

The arch-shaped heating element 130 must have a shape corresponding to the outer circumferential surface of the first plastic pipe 110 and, as shown in FIG. 3 or 5, has an arch-shaped cross-section.

Also, the arch-shaped heating element 130 is disposed in such a way that it encloses the connection hole 111 of the first plastic pipe 110. As shown in FIG. 4, corresponding to the connection hole 111 of the first plastic pipe 110, an opening 131 is formed in a central portion of the arch-shaped heating element 130.

Furthermore, the arch-shaped heating element 130 is made of conductive plastic material which generates heat when electricity is supplied thereto. Such conductive plastic material has been stated in the description of the conventional art, and further explanation thereof is deemed unnecessary.

The cover 121 of the second plastic pipe 120 encloses both inner and outer surfaces of the arch-shaped heating element 130.

The cover 121 of the second plastic pipe 120 includes an outer cover part 121a which is provided on the outer surface of the arch-shaped heating element 130, and an inner cover part 121b which is provided on the inner surface of the arch-shaped heating element 130.

When the arch-shaped heating element 130 generates heat, the inner cover part 121b is melted and thus integrated with the outer surface of the first plastic pipe 110.

To supply electricity to the arch-shaped heating element 130, a pair of electric connection terminals 140 are provided in the arch-shaped heating element 130.

In this comparative example, facing each other, the electric connection terminals 140 are disposed on opposite sides of the opening 131 and oriented parallel to each other.

By virtue of the above-mentioned disposition of the electric connection terminals 140, the shortest distance between the electric connection terminals 140 disposed in the arch-shaped heating element 130 can be easily maintained constant at all points of the electric connection terminals 140.

To connect the electric connection terminals 140 linearly disposed in the arch-shaped heating element 130 to an external power supply, an auxiliary connection terminal 141 extends from each electric connection terminal 140 to the outside of the arch-shaped heating element 130. The shape and location of the auxiliary connection terminal 141 can be changed in various ways depending on embodiments.

After the elements have been disposed as described above, the electric connection terminals 400 are connected to the power supply (not shown) and power is applied to the electric connection terminals 400 for a predetermined time. Then, the arch-shaped heating element 130 is heated by current that flows along the electric connection terminals 400. The arch-shaped heating element 130 and the cover 121, particularly, the inner cover part 121b, are fused to the outer circumferential surface of the first plastic pipe 110 by heat generated from the arch-shaped heating element 130 and are thus integrated therewith.

FIG. 6 is a conceptual plan view showing the structure of the electric connection terminals 140 and the arch-shaped heating element 130 having the opening 131.

As shown in the drawing, in the case of portions other than the opening 131, current can linearly flow along the shortest distance between the electric connection terminals 140.

However, in the case of a portion defining the opening 131, current flows along the shortest distance around the opening 131 between the electric connection terminals 140.

Therefore, much more current flows in portion A, while little current flows in portion B.

Meanwhile, in the arch-shaped heating element 130 that is made of conductive plastic material, at an initial stage of a heating process, as the temperature of the heating element increases, the matrix-phase polymer of the heating element 130 expands. Thereby as the distances between conductive particles connected to the polymer are increased, resistance is increased, so that the heating element 130 has PTC (positive temperature coefficient) characteristics.

Furthermore, as the temperature of the heating element 130 increases, while the temperature passes through the melting point at which the matrix-phase polymer of the heating element 130 begins to be melted, the resistance becomes maximal at the melting point and thereafter is rapidly reduced. The reason for this is because of the fact that when an electric field is applied to polymer in a liquid state, conductive particles are connected to each other again in the direction of the electric field. In this regard, the arch-shaped heating element has NTC (negative temperature coefficient) effect at a temperature over a predetermined level.

Therefore, in the arch-shaped heating element 130, even when constant voltage is applied to the electric connection terminals 140, portion A is more rapidly heated and melted than the other portions. Therefore, when the other portions are heated and melted, portion A is already in the molten state. In this state, portion A receives power (that is, heat), so that the temperature thereof continuously increases and, ultimately, exceeds the fire point of the matrix-phase polymer. As a result, the matrix-phase polymer is decomposed and thus easily broken, whereby the shape thereof cannot be maintained.

Furthermore, even when constant voltage is applied to the electric connection terminals 140 of the arch-shaped heating element 130, little power is applied to the portion B, so that portion B is not reliably fused.

As such, the comparative example is problematic in that both portion A and portion B are not reliably fused.

Hereinafter, an embodiment of the present invention will be described in detail.

Figure 7:
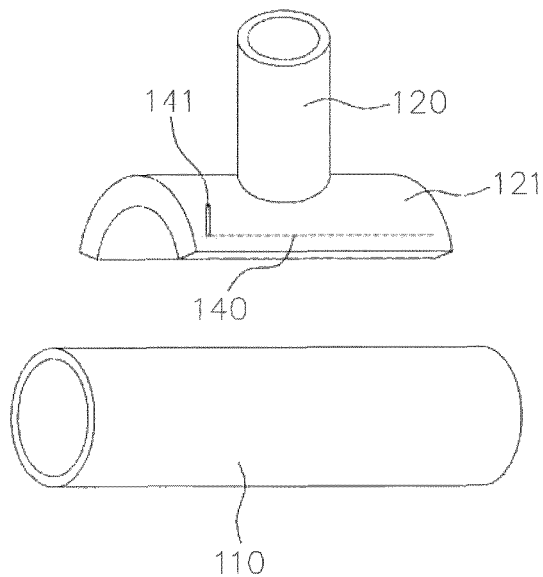
FIG. 7 is a perspective view showing a first plastic pipe that is just before being placed on a second plastic pipe according to an embodiment of the present invention.
Figure 8:
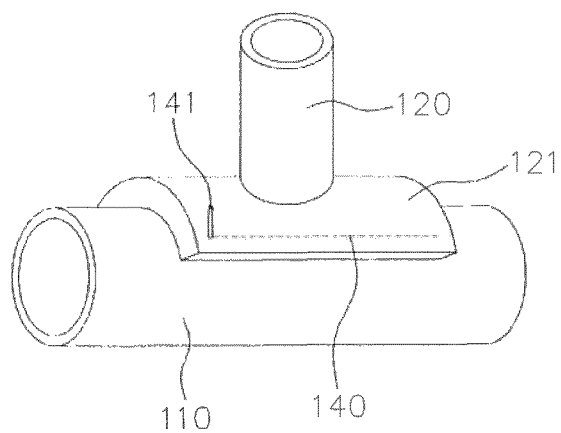
FIG. 8 is a perspective view showing the first plastic pipe placed on the second plastic pipe of FIG. 7.
Figure 9:
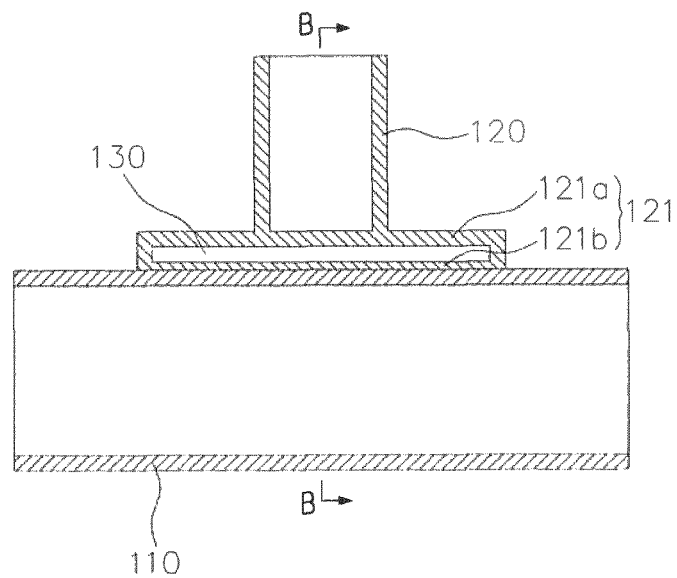
FIG. 9 is a longitudinal sectional view of FIG. 8.
Figure 10:
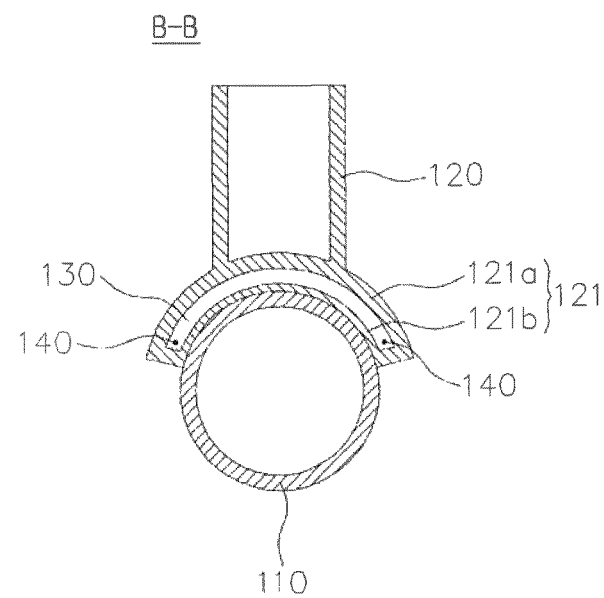
FIG. 10 is a sectional view taken along line B-B of FIG. 9.
Figure 11:
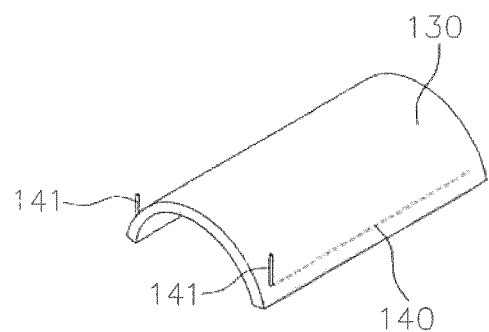
FIG. 11 is a perspective view of an arch-shaped heating element used in the embodiment of the present invention.
Figure 12:
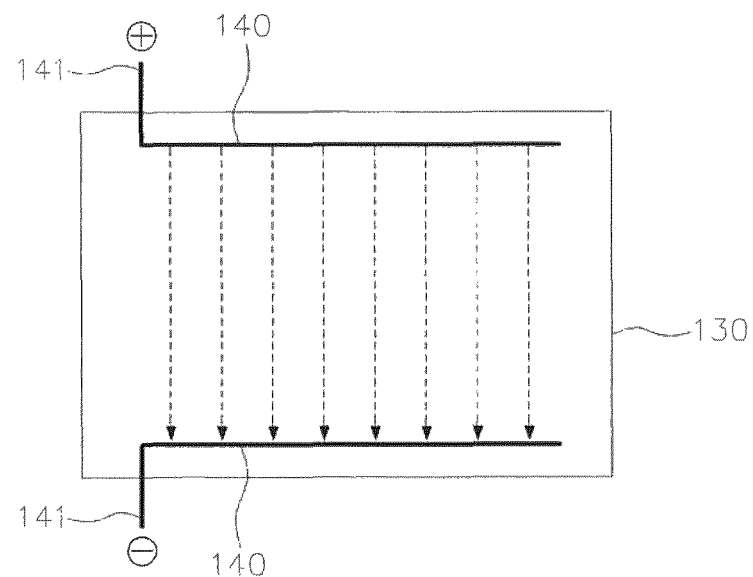
FIG. 12 is a conceptual view showing conditions in which power is applied to the arch-shaped heating element of FIG. 11.
Figure 13:
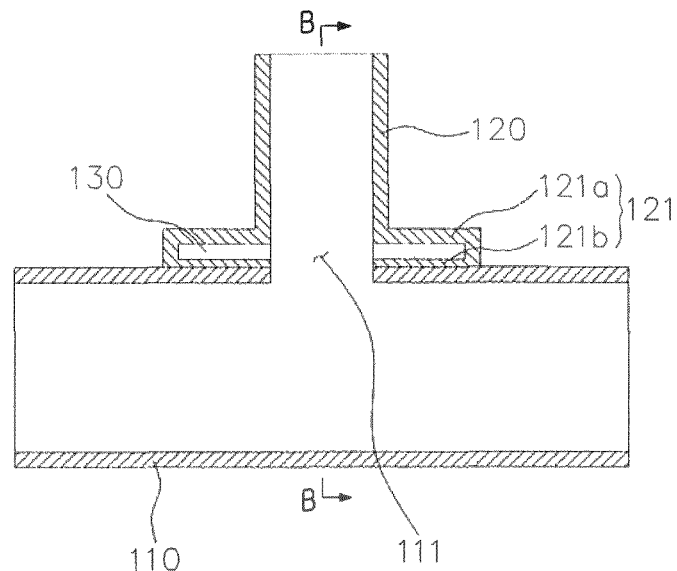
FIG. 13 is a view corresponding to FIG. 9, but showing a connection hole formed after power is supplied to the arch-shaped heating element.
Figure 14:
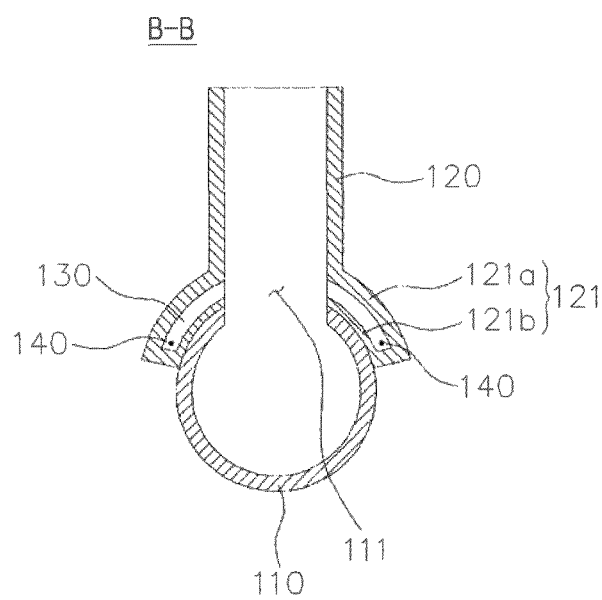
FIG. 14 is a sectional view taken along line B-B of FIG. 13.
Figure 15:
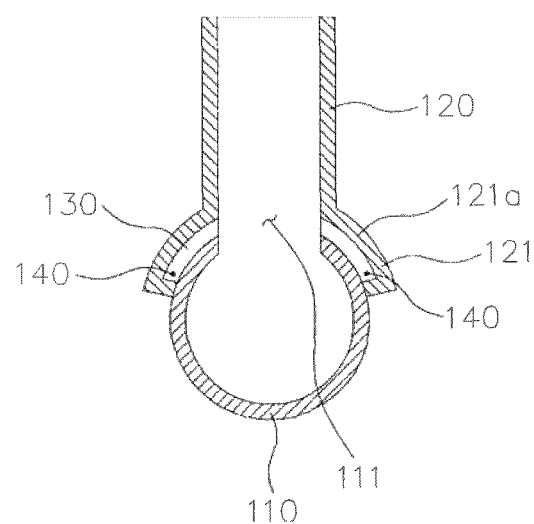
FIG. 15 is a view corresponding to FIG. 14, but showing a cover having no inner cover part.

FIG. 7 is a perspective view showing a first plastic pipe 110 that is just before being placed on a second plastic pipe 120 according to an embodiment of the present invention. FIG. 8 is a perspective view showing the first plastic pipe placed on the second plastic pipe of FIG. 7. FIG. 9 is a longitudinal sectional view of FIG. 8. FIG. 10 is a sectional view taken along line B-B of FIG. 9. FIG. 11 is a perspective view of an arch-shaped heating element used in the embodiment of the present invention. FIG. 12 is a conceptual view showing conditions in which power is applied to the arch-shaped heating element of FIG. 11. FIG. 13 is a view corresponding to FIG. 9, but showing a connection hole formed after power is supplied to the arch-shaped heating element. FIG. 14 is a sectional view taken along line B-B of FIG. 13. FIG. 15 is a view corresponding to FIG. 14, but showing a cover having no inner cover part.

A method of connecting plastic pipes according to the embodiment of the present invent includes three steps, in detail, (1) plastic pipe placing step, (2) power supply step and (3) connection hole forming step.

(1) Plastic Pipe Placing Step

An arch-shaped heating element 130, a pair of electric connection terminals 140 and the second plastic pipe 120 are placed on the first plate pipe 110 that has been already installed, without a connection hole 111 being formed in the first plate pipe 110.

In this step, the connection hole 111 is not formed in the first plastic pipe 110.

The arch-shaped heating element 130 is placed in such a way that it covers a portion of the first plate pipe 110 in which the connection hole 111 is intended to be formed. The arch-shaped heating element 130 has a curved plate shape without having an opening 131.

The electric connection terminals 140 are oriented parallel to each other and disposed on opposite sides of the portion of the first plate pipe 110 in which the connection hole 111 is intended to be formed.

In this embodiment, the cover 121 of the second plastic pipe 120 encloses the arch-shaped heating element 130, in other words, covers both inner and outer surfaces of the arch-shaped heating element 130. As needed, the cover 121 may be configured such that it covers only the outer surface of the arch-shaped heating element 130.

The second plastic pipe 120 of this embodiment is configured in such a way that an end thereof is closed by the cover 121. Further, the end of the second plastic pipe 120 is also covered with the arch-shaped heating element 130.

Meanwhile, in this embodiment, although the arch-shaped heating element 130 and the electric connection terminals 140 have been illustrated as being integrally formed along with the cover 121 of the second plastic pipe 120, the second plastic pipe 120 and the arch-shaped heating element 130 may be manufactured through separate processes and individually installed on a site.

(2) Power Supply Step

After the plastic pipe placing step, the electric connection terminals 400 are connected to the power supply (not shown) and power is applied to the electric connection terminals 400 for a predetermined time. Then, the arch-shaped heating element 130 is heated by current that flows along the electric connection terminals 400. The arch-shaped heating element 130 and the cover 121, particularly, the inner cover part 121b, are fused to the outer circumferential surface of the first plastic pipe 110 by heat generated from the arch-shaped heating element 130 and are thus integrated therewith.

Here, as shown in FIGS. 11 and 12, because the arch-shaped heating element 130 has a plate shape having no opening 131, the entire portion between the electric connection terminals 400 is uniformly heated, melted and fused.

(3) Connection Hole Forming Step

After the plastic pipe placing step, as shown in FIGS. 13 and 14, a connection hole 111 is formed at a predetermined position in the arch-shaped heating element 130, the cover 121 and the first plastic pipe 110 such that the first plastic pipe 110 communicates with the second plastic pipe 120.

Thereby, the first plastic pipe 110 and the second plastic pipe 120 are integrated with each other by fusion in such a way that they communicate with each other.

According to the above-mentioned method, the second plastic pipe 120 can be connected to the first plate pipe 110 with satisfactory fusion quality.

Meanwhile, as necessary, the cover 121 may include only the outer cover part 121a without having the inner cover part 121b. In this case, as shown in FIG. 15 that is a view corresponding to FIG. 14, the arch-shaped heating element 130 is directly fused to and integrated with the outer circumferential surface of the first plastic pipe 110.

As described above, the present invention provides a method of connecting two plastic pipes in a T-shaped form, particularly, a method of connecting a second plastic pipe, in a branch shape, to a first plate pipe that has been already installed. According to the plastic pipe connection method, the fusion quality can be markedly enhanced. Furthermore, the present invention provides a connection structure for realizing the plastic pipe connection method.

Although the preferred embodiment of the present invention has been disclosed, those skilled in the art will appreciate that various modifications, additions and substitutions are possible, without departing from the scope and spirit of the invention as disclosed in the accompanying claims. Therefore, it should be understood that the preferred embodiment is only for illustrative purposes and does not limit the bounds of the present invention. For instance, components which have been illustrated as being integrated with each other may be implemented in a separate structure, and components which have been illustrated as being separately provided may be provided in an integrated structure.

Therefore, it is intended that the bounds of the present invention are defined by the accompanying claims, and various modifications, additions and substitutions, which can be derived from the meaning, scope and equivalent concepts of the accompanying claims, fall within the bounds of the present invention.

What is claimed is:

1. A method for connecting first and second plastic pipes to each other in such a way that an end of the second plastic pipe is connected to an arcuate side surface of the first plastic pipe to communicate the first plastic pipe with the second plastic pipe, the end of the second plastic pipe having a connection hole while the first plastic pipe does not initially have a connection hole, the method comprising:
   providing an arch-shaped heating element made of conductive plastic material that conforms in shape to the arcuate side surface of the first plastic pipe, the heating element not initially having a hole therein, the heating element generating heat when electricity is applied thereto;
   disposing a pair of electrical connection terminals parallel to each other in opposite sides of the heating element;
   covering at least an outer surface of the heating element with a cover;
   connecting the cover and heating element on the end of the second plastic pipe;
   placing the second plastic pipe, the cover and the heating element on the arcuate surface of the first plastic pipe in the area where a connection between the first and second plastic pipes is desired;
   supplying power to the electric connection terminals to heat the arch-shaped heating element so that the second plastic pipe is fused to the first plastic pipe; and
   thereafter, forming a connection hole in the cover, the arch-shaped heating element and the side surface of the first plastic pipe after supplying the power is conducted, so that the first plastic pipe and the second plastic pipe communicate with each other through the connection hole.

2. The method as set forth in claim 1, wherein the electric connection terminals are in line contact with the arch-shaped heating element, and shortest distances between the electric connection terminals at all points of any one of the electric connection terminals are equal to each other.

3. A structure for connecting first and second plastic pipes to each other in such a way that an end of the second plastic pipe is fused to a side surface of the first plastic pipe to communicate the first plastic pipe with the second plastic pipe through a connection hole, the structure comprising:
   an arch-shaped heating element made of conductive plastic material that generates heat using electricity applied thereto, the arch-shaped heating element having an arch cross-sectional shape to conform with the side surface of the first plastic pipe;
   a pair of electric connection terminals disposed parallel to each other in the arch-shaped heating element on opposite sides of a portion of the heating element intended to form the connection hole therein;
   a cover covering at least an outer surface of the arch-shaped heating element; and
   the cover and heating element being connect to an end of the second pipe and closing the hold in the second pipe,
   wherein a connection hole in the cover, the arch-shaped heating element and the side surface of the first plastic pipe can be formed, after supplying the power to the electric connection terminals, so that the first plastic pipe and the second plastic pipe communicate with each other through the connection hole.

* * * * *